United States Patent [19]
Bischof

[11] Patent Number: 6,024,793
[45] Date of Patent: Feb. 15, 2000

[54] METHOD AND DEVICE FOR SEPARATING A SUBSTANCE FROM A LIQUID MIXTURE BY FRACTIONAL CRYSTALLIZATION

[75] Inventor: Rudolf Bischof, Sevelen, Switzerland

[73] Assignee: Sulzer Chemtech AG, Winterthur, Switzerland

[21] Appl. No.: 08/869,027

[22] Filed: Jun. 4, 1997

[30] Foreign Application Priority Data

Jun. 5, 1996 [CH] Switzerland .......................... 1416/96

[51] Int. Cl.⁷ ...................................... C30B 7/08
[52] U.S. Cl. ...................... 117/11; 23/295 R; 422/260
[58] Field of Search ........................ 23/295 R; 117/11; 422/245.1, 250.1, 251, 260

[56] References Cited

U.S. PATENT DOCUMENTS

| | | |
|---|---|---|
| 3,272,875 | 9/1966 | Gordon et al. . |
| 3,385,074 | 5/1968 | Aronson . |
| 3,404,536 | 10/1968 | Aronson . |
| 4,552,575 | 11/1985 | Stolzenberg et al. . |
| 4,799,945 | 1/1989 | Chang . |
| 4,954,151 | 9/1990 | Chang et al. . |
| 5,700,435 | 12/1997 | Bischof . |

FOREIGN PATENT DOCUMENTS

| | | |
|---|---|---|
| 0 085 791 | 8/1983 | European Pat. Off. . |
| 0 313 827 | 5/1989 | European Pat. Off. . |
| 0 378 166 | 7/1990 | European Pat. Off. . |
| 1 769 123 | 2/1976 | Germany . |
| 1 218 743 | 1/1971 | United Kingdom . |

*Primary Examiner*—Felisa Hiteshew
*Attorney, Agent, or Firm*—Frishauf, Holtz, Goodman, Langer & Chick, P.C.

[57] ABSTRACT

For the purpose of separating a substance from a liquid mixture by crystallization, the inner walls of pipes in a crystallizer (S-1, S-2, S-3) are cooled by evaporating a liquid medium, the pressure of the gaseous phase of the medium being controlled in accordance with the temperature required for crystallization. In these conditions a layer of crystals forms on the outer walls of the pipes and can later be melted. The previously-formed crystal layer is melted in one crystallizer simultaneously with crystallization in another crystallizer. This is done by introducing gaseous medium which is produced in a crystallizer during the said evaporation. In addition, heat energy can be supplied to the crystallizer where melting occurs, in order to evaporate liquid medium there so that melting is accelerated. The two simultaneously operating crystallizers operate respectively as an evaporator and as a condenser in a refrigerating unit (11), thus saving considerable energy compared with known crystallization methods.

19 Claims, 2 Drawing Sheets

METHOD AND DEVICE FOR SEPARATING A SUBSTANCE FROM A LIQUID MIXTURE BY FRACTIONAL CRYSTALLIZATION

FIELD OF THE INVENTION

The invention relates to a method and device for separating a substance from a liquid mixture by fractional crystallisation.

BACKGROUND

In addition to the normal distillation methods, crystallisation methods are becoming increasingly important. There are various reasons for this. One advantage of crystallisation, for example, is that heat-sensitive substances can be obtained or purified at low temperatures. Also, there is no need for an expensive vacuum installation, as in the case of vacuum distillation. In many cases also, higher purity can be obtained than by distillation.

U.S. Pat. No. 3,272,875 describes a crystalliser with pipes through which a coolant flows and the outer walls of which serve as a crystallisation surface. The coolant circuit is a secondary circuit and conveys liquid coolant from the outlet of a circulating pump to one end of the pipes, then through the pipes and from the other ends of the pipes to a heat exchanger and then back to the circulating pump. The heat exchanger transfers cooling energy from a primary circuit, i.e. the circuit of a cooling system The product circuit leads from a product circulating pump to the outer walls of the pipes at one end of the pipes and then from the other ends of the pipes to a heat exchanger and then back to the product-circulating pump. The heat exchanger in the product circuit receives heat energy from a heat source. When the aforementioned crystalliser is in operation, a layer of crystals forms on the outer wall of the pipes. U.S. Pat. No. 3,272,875 does not give any details as to how the layer of crystals is removed. It is known however, that after the mother liquor has been run off from the product circuit, the layer of crystals can be melted off either by raising the temperature in the cooling circuit or by introducing and circulating previously-obtained product. The heating energy necessary for melting can be supplied via the heat exchangers disposed in the product circuit. U.S. Pat. No. 3,272,875 describes the process on a laboratory scale only. There is no information as to how the method described can be converted to industrial practice. More particularly there is no information about multi-stage crystallisation. It can be seen, however, that the need for a number of heat exchangers will result in expensive apparatus. Owing to the resulting energy losses and the chosen method of operation, the energy requirement will be high, the cooling energy being particularly expensive.

Efforts have long been made to reduce the expense of apparatus and energy required for fractional crystallisation. For example in DE-A-17 69 123 it is proposed to cool the crystalliser directly by the medium in the cooling plant, by withdrawing vapour from the space in the crystalliser jacket. However there is no information as to doing this in practice, and also no directly-cooled crystallisers have become known during the 25 years since U.S. Pat. No. 3,272,875 was published.

In contrast to the crystalliser according to the initially-menticned U.S. Pat. No. 3,272,875, in the crystalliser according to DE-A-1 769 123 the pipes are cooled from the exterior and the liquid mixture is delivered in a film trickling down on to the insides of the pipes. Also in multi-stage crystallisation a crystalliser is not provided for every stage. Instead, multi-stage crystallisation is effected in different cycles in a single crystalliser. To reduce the energy costs further, it is proposed that the heat produced in the condenser of the cooling plant should be partly stored in a heating-medium tank and used later to melt the crystals, via a heat-exchanger in the product circuit. Excess heat is to be discharged in cooling water or in extreme cases via a second cooling plant. This known method has the disadvantage of expensive apparatus and energy losses during energy storage and conversion.

U.S. application Ser. No. 08/566,792, filed Dec. 4, 1995 U.S. Pat. No. 5,700,435, by the inventor here of, the disclosure of which is hereby incorporated by reference, describes a method of separating a substance from a liquid mixture by fractional crystallisation, wherein a layer of crystals is deposited on one side of a wall which is cooled on the other side. Cooling is effected by evaporating a medium, and by adjusting the pressure of the gaseous phase of the medium in the crystalliser, in accordance with the temperature required for crystallisation. On the other hand, the layer of crystals is melted or is caused to sweat by condensing the medium, supplied in the gaseous phase, on the wall. In this operation the pressure of the gaseous phase is controlled in accordance with the temperature required for the purpose at the wall. If at least two crystallisers are present, one crystalliser can be used for crystallisation and the other crystalliser for melting the crystallised substance. Consequently one crystalliser operates as a condenser and another crystalliser operates as an evaporator in a refrigerating machine. In this manner both the cold energy and the waste heat from the refrigerating machine are directly used. This saves considerable energy compared with the known method.

Also, in the method describe in my aforemention application Ser. No. 08/566,792, additional heat energy is supplied if necessary for melting the crystallised substance. This purpose is served by an auxiliary evaporator which can be connected by pipes and valves to one or tore crystallisers requiring the additional heat energy. For example the crystallised substance can be melted more quickly than if the only available energy is from another crystallise. In general, the availability of external heat energy makes the process more flexible. The disadvantage, however, is the expensive apparatus required in the form of piping and liquid separators for the refrigerating medium. There may also be problems through condensation and resulting liquid surges.

SUMMARY OF THE INVENTION

The object of the invention is to improve the process according to my earlier invention so that it can be carried out with lower investment and energy costs and higher reliability.

This problem is solved by control the pressure of a heat exchange medium on one side of a wall, in gaseous phase in accordance with the temperature required for crystallisation after which, for the purpose of melting the crystallised layer or for sweating, the side of the wall is heat by gaseous heat exchange medium produced by evaporation during crystallisation in another crystalliser, the pressure thereof being controlled in accordance with the temperature required for melting; if necessary, additional heat energy is supplied to the first-mentioned crystalliser for evaporaton of liquid medium.

Since according to the invention the additional heat energy is not supplied via a separate auxiliary evaporator but is supplied to the medium in the crystalliser, there is no need for a separate auxiliary evaporator and the pipes from it to the crystalliser. It also eliminates the associated problems, such as liquid surges and pressure losses in the pipes.

The invention also relates to a device to carry out the method. Advantageously, in this device a radiator is disposed inside the crystalliser in the sump for the liquid heat exchange medium. Alternatively, the radiator could be disposed in a separate tank communicating with the crystalliser, so as to have the same pressure in the crystalliser as in the separate tank. This variant is particularly advantageous when a existing plant needs to be refitted but there is no space in the crystalliser for incorporating a radiator.

Advantageously, an inlet and outlet device for gaseous medium is disposed in the medium chamber of the crystalliser and has upwardly directed openings, and a drop separator is disposed at a distance above the inlet and outlet device. This prevents drops of liquid medium from being entrained towards the compressor with the extraction gas.

Other advantages of the embodiments of the invention described in the claims will be clear from the following description.

DRAWINGS

FIG. 1 is schematic flow a diagram of the cooling system according to the invention for a plant for multistage fractional crystallisation, and FIG. 2 is an elevational view which shows a crystalliser which is particularly suitable for a cooling system as in FIG. 1.

DETAILED DESCRIPTION

The invention is particularly advantageous for multistage crystallisation with two or more crystallisers. The invention will therefore be described with reference to an example of multi-stage crystallisation but is not restricted thereto. Since multi-stage crystallisation plants are well-known to the skilled man, there is no need here for details as to how the substance is conveyed in such plants. Reference may instead be made to the relevant technical literature and to the initially-mentioned publications.

Figure 1:
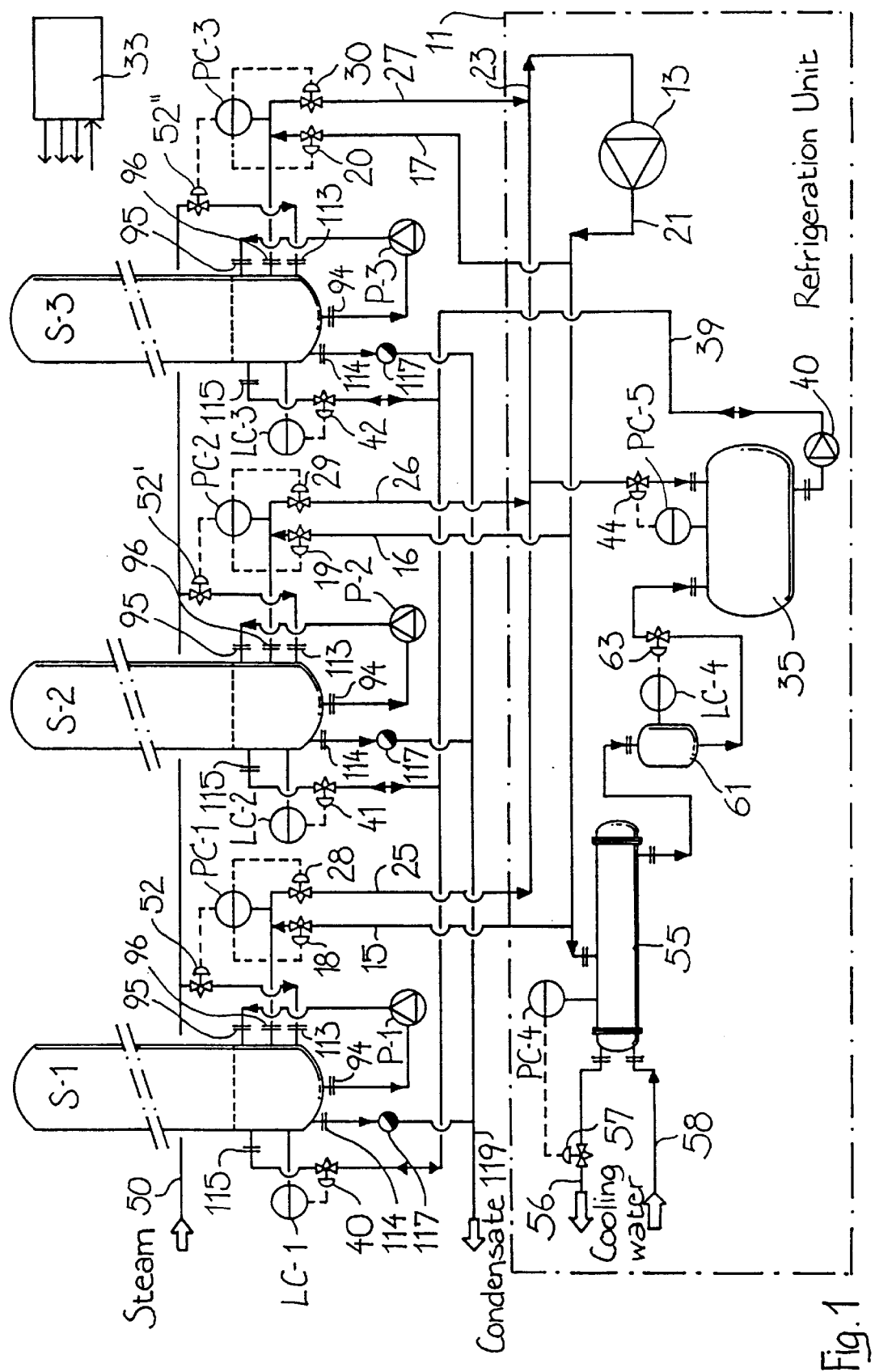

FIG. 1 shows a crystallisation plant for multi-stage fractional crystallisation containing e.g. three crystallisers S-1, S-2 and S-3. Usually at least two crystallisers are simultaneously in operation, one as an evaporator and the other as a condenser of a refrigerating unit. A crystalliser acts as an evaporator during crystallisation and as a condenser during melting. In the plant according to the invention, therefore, the refrigerating machine 11 does not consist of the conventional unit comprising a compressor 13, an evaporator and a condenser. Instead, the evaporator and condenser are separated from the unit 11 and constitute a part of the crystallisers S-1, S-2 and S-3. This presupposes that in principle at least one crystalliser always operates as an evaporator and at least one other as a condenser, unless an auxiliary condenser or auxiliary evaporator is available in addition. However, even when a number of crystallisers are simultaneously operating as evaporators or condensers in different stages of the process, the temperature of the wall at which the crystals are formed or melted can be kept different for each crystalliser. To this end it is only necessary to control the pressure of the gaseous phase of the medium in each crystalliser in accordance with the temperature required at the wall.

If the heating energy required for melting the crystals is more than the waste heat during crystallisation, additional heat must be supplied. This is done according to the invention by supplying external heat energy to the medium in the crystalliser, as explained in detail hereinafter.

The pressure of the gaseous medium in the crystallisers S-1, S-2, S-3 is controlled by measuring and control devices PC-1, PC-2 and PC-3 connected to the lines 25, 26 or 27, the set pressure being determined by the process control unit 33.

A line 25, 26, 27 leads from the connections 96 of the crystallisers S-1, S-2, S-3 to a collecting line 23, which leads to the input side of the compressor 13. The collecting line 23 is at a relatively low pressure, e.g. 2 bar. Control valves 28, 29, 30 can individually control the pressure of the gaseous medium, e.g. ammonia, in the crystalliser during crystallisation. This determines the evaporation temperature of the medium which cools the tubes 75 (FIG. 2) of the crystalliser.

Gaseous medium can be conveyed from the pressure side of the compressor 13 through a distribution line 21 and branch lines 15, 16, 17 to the connection 96 of the respective crystalliser S-1, S-2, S-3. The distribution line 21 is at a relatively high pressure, e.g. 14 bar. Control valves 18, 19, 20 in the branch lines 15, 16, 17 can individually control the pressure of the gaseous medium in the respective crystalliser S-1, S-2, S-3, when. melting the crystals. This determines the condensation temperature of the medium heating the tubes of the crystalliser.

The set values of the pressure and consequently of the temperature during crystallisation and melting can be detected by the process control unit 33.

Liquid medium from the collecting tank 35 can be supplied to the crystallisers S-1, S-2, S-3 via the line 39. Liquid medium from the collecting tank 35 is admitted through line 39 to the sump 93, FIG. 2, of the crystallisers S-1, S-2, S-3 by control valves 40, 41, 42, which are controllable by the liquid-level measuring and control devices LC-1 LC-2, LC-3. A pump 40 may be provided to pump liquid medium to the crystallisers.

The collecting task 35, which is connected to the suction side of the compressor 13, is kept at a constant pressure by a pressure-measuring and control device PC-5 and a valve 44. The collecting tank 35 thus also serves as an economiser. The pressure in the collecting tank 35 is adjusted to the optimum value both for the supply of liquid medium to and the return flow from the crystalliser.

For the purpose of crystallisation, the swap 93 of the respective crystalliser S-1, S-2, S-3 is filled with liquid medium from the collecting tans 35 through the connection 115. Each crystalliser S-1, S-2, S-3 has its own pump P-1, P-2, P-3 for circulating the coolant from connection 94 to connection 95. The pump operates irrespectively of the pressure in compressor 13. The amount in circulation therefore need not be controlled and the pump power does not change while the pressure is being lowered during cooling for the crystallisation process. The difference in pressure to be overcome by the pump is determined only by the static height and the pressure losses in the pipes in the circuit.

As before, the process control unit 33 is what determines which crystalliser or crystallisers shall operate as an evaporator and consequently which valve or valves 40, 41, 42 shall be opened or closed.

The crystals can be melted in a much shorter time than they are formed. If therefore crystals are to be melted in one crystalliser while another crystalliser is in use for crystallisation, the waste heat delivered by the cooling unit 11 will be insufficient to bring about melting faster than crystallisation. External heat must therefore be supplied. For the purpose of supplying additional heat energy, a radiator is provided in each crystalliser. Each respective radiator 53

(FIG. 2) can operate e.g. on waste steam through line 50 and valve 52, 52', 52". The valve 52, 52', 52" is controlled in, accordance with the set pressure determined by the process control unit 33 and the pressure measured by the pressure-measuring and control device PC-1, PC-2 or PC-3. The outlet connection 114 of the respective radiator 53 is connected via a liquid separator 117 to the condensate discharge line 119.

An auxiliary condenser 55 is provided for discharging excess heat energy. The auxiliary condenser 55 can be connected to a cooling-water circuit by lines 56, 58 and a valve 57. Alternatively, it is also possible to provide an air-cooled condenser. The auxiliary condenser 55 is connected to the distribution line 21 in order to remove gaseous medium therefrom and condense it when less waste heat is needed than the cooling unit 11 is supplying at the moment. The valve 57 is controlled by the measuring and control device PC-4 and in accordance with the set pressure determined by the process control unit 33. Medium liquefied by the auxiliary condenser 55 can flow into the tank 61, which serves as a reservoir for the collecting tank 35. Reference LC-4 denotes a liquid-level measuring and control device, which controls the valve 63. The supply of liquid medium from tank 61 to the collecting tank 35 thus occurs via the valve 63.

Figure 2:
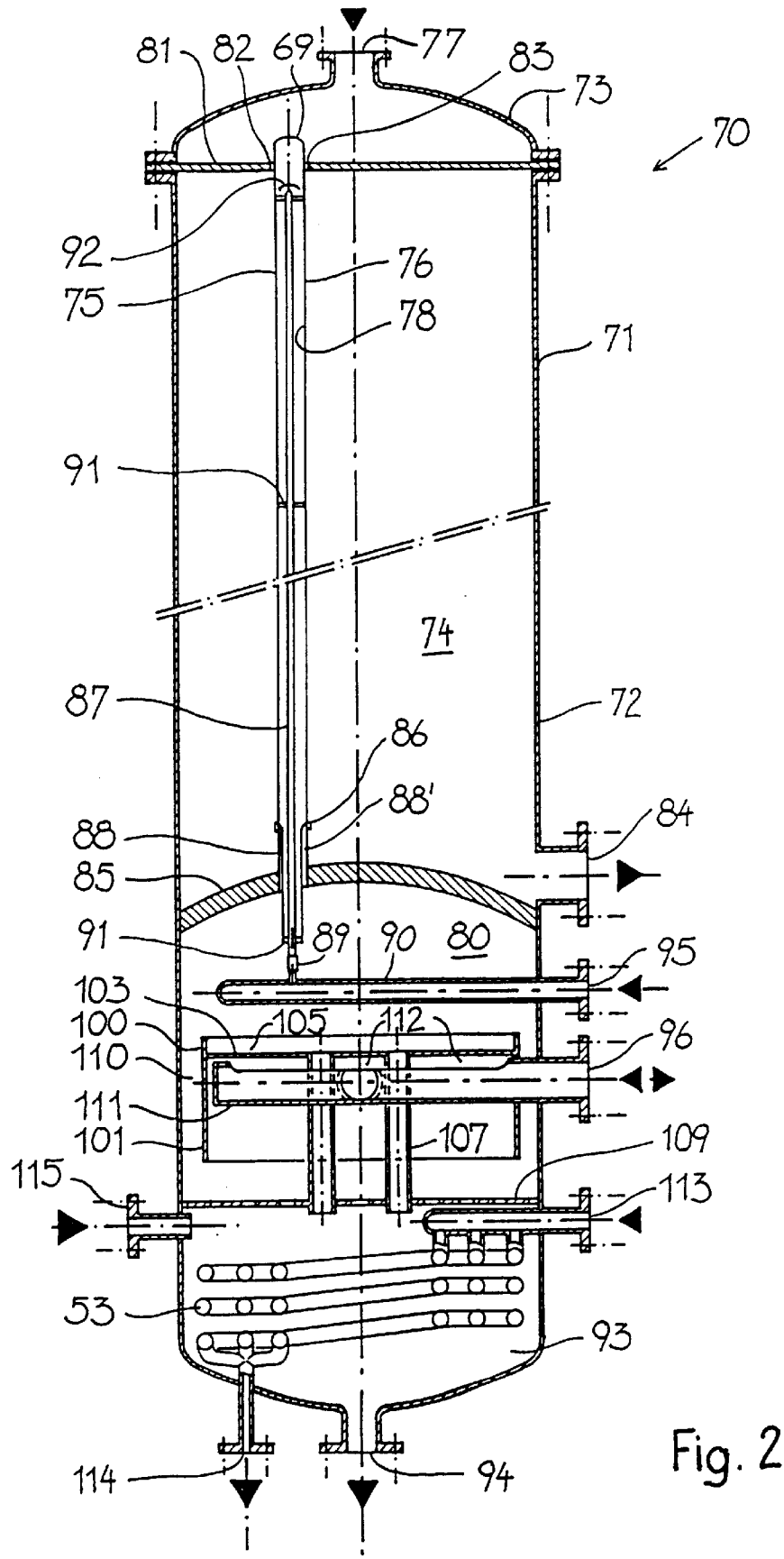

The crystallisers. S-1, S-2, S-3 in all the stages can have the same construction. An exemplified embodiment of a crystalliser is shown in FIG. 2. The crystalliser 70 substantially comprises a tank 71 closed by a cover 73 above a distribution tray 81. A number of pipes 75 (only one is shown) are disposed in the tank 71. They form the wall at which crystallisation occurs. The liquid mixture can trickle in a film down the outer walls 76 of the pipes 75. The inlet 77 for the liquid mixture is in the cover 73. The distribution tray 81 has a number of openings 82 through which the pipes 75 project upwards, the top ends 69 of the pipes being closed. The liquid mixture can then trickle in a film down through the gap 83. The desired crystals then form on the outer wall 76, owing to the cooling of the pipe 75. The outlet 84 is at the product tray 85. The liquid medium can be recirculated from the outlet 84 to the inlet 77 in known manner by a circulating pump (not shown) until the crystallisation process in this stage has ended.

The crystalliser 70 can serve alternately as an evaporator and as a condenser. To this end each pipe 75 contains a rising pipe 87 which extends into the pipe 75 from a screw connection 89 provided for assembly purposes on the rising-pipe plate 90. The rising pipe 87 is centred in the pipe 75 by spacers 91. A coolant distributor 92 is disposed at a distance from the top end of the rising pipe 87 and ensures that the medium used as a coolant trickles in a film down the inner wall 78 of the pipe 75 in order to cool it. In this arrangement of the coolant distributor 92, the top part of the pipe 75 and the distribution tray 81 are not cooled, so that the liquid mixture can always flow unhindered through the gap 83. If however the crystalliser is operating as a condenser for melting the crystals, the top part of the pipe is also heated by the medium condensing in the pipe 75. A collar 86 is provided on the pipe 75 at a distance from the preferably curved product tray 85 and consists e.g. of a ring secured to the pipe 75 and is adapted to prevent the crystals forming on the pipe 75 from slipping down. A pipe 88, preferably disposed inside the pipe 75, for deflecting the trickling film extends to the collar 86 and prevents crystals from forming in the region under the collar 86. A cavity 88' is formed between the pipe 75 and the deflecting pipe 88. When the crystalliser operates as a condenser, the bottom part of the pipe 75 is also heated by the medium condensing in the cavity 88' on the wall of the pipe 75.

During crystallisation, non-evaporated medium or condensed medium formed during melting or condensation can flow away into the sump 93. From there, the liquid medium, can be discharged through the connection 94 and pumped round to the connection 95. The connection 96 is for discharging the evaporated medium during crystallisation and for supplying gaseous medium when the crystals are being melted.

It should be noted that the crystalliser 70 is divided by the product tray 85 into two chambers 74, 80, between which there can be considerable differences of pressure. For example the crystallisation chamber 74 is usually at slightly above ambient pressure, whereas the medium 80 is e.g. at a pressure of the order of 14 bar. It is very important to prevent medium from leaking anywhere into the product chamber 74. The construction of the crystalliser 70 according to the invention does not require any potentially leaky screw joints for the crystalliser pipes 75. Since the medium is conveyed through a rising pipe 87 to the top part of pipe 75, the pipe 75 can be closed by welding at the top end 69. At the bottom the pipe 75 can be welded into the product tray 85, which in turn can be welded to the jacket 72 of the tank 71. Welded connections of this kind are gastight during operation of the crystalliser. Another advantage of the construction shown is that the pipes 75 can move freely in the distribution tray 81. There is thus no risk that a pipe 75 will be damaged if the cooling or heating fails and it consequently contracts or expands differently from the other pipes.

We shall now describe the special design of the crystalliser 70 in the medium chamber 80. Below the rising-pipe plate 90 is a drop separator 100 for liquid medium dropping from the pipes 75 above. A pipe portion 101 disposed concentrically in the tank 71 contains a plate 103, somewhat below the top edge, and co-operating with the pipe portion 101 to form a cylindrical trough 105 for receiving the dripping medium. One or more discharge pipes 107 lead from the trough 105 to the sump 93 under the perforated tray 109. An inlet and outlet device 111 for gaseous medium and connected to the connection 96 is disposed under the trough 105 and advantageously comprises a pipe cross with slits 112 at the top.

Gaseous medium formed during crystallisation flows at relatively high speed, about 9 m/sec, through the annular gap 110, entrained drops of liquid medium falling on the perforated tray 109 and flowing into the sump 93. The gaseous medium on the other hand is diverted upwards at the perforated plate 109. The speed of the rising gases is relatively low, about 0.25 m/sec. At the plate 109 they are again deflected downwards and can flow away through the device 111 and the connection 96. The drop separator 100 prevents drops from being entrained towards the compressor 13 by the gas sucked through the connection 96.

The sump 93, containing the inlet 115 for liquid medium, is disposed under the perforated tray 109. The radiator 53 is disposed in the sump 93 and has an inlet connection 113 for steam and an outlet connection 114. The radiator 53 is in the form e.g. of a pipe coil or a plate heat exchanger. It is possible to design the crystalliser as to permit the fluid medium to trickle down on the radiator 53.

Before melting of the crystals, the excess liquid medium in the sump 93 is discharged therefrom under the control of the liquid measuring and control device LC-1, LC-2 or LC-3 until the radiator 53 is only partly or not anymore immersed in liquid medium. The transportation of the liquid medium to the collecting tank 35 will be effected by the pressure in the crystalliser.

During melting of the crystals, the appropriate radiator 53 can be switched on as required. The supply of steam to the respective radiator 53 is controlled by the pressure-measuring and control device PC-1, PC-2, PC-3 which acts on the valve 52, 52', 52". The respective outlet connection 114 for the condensate is connected to the condensate discharge line 119 via a ventilated condensate trap 117. This results in total emptying and prevents damage through frost.

Various modifications are possible without departing from the inventive idea. One possibility, for example, in a crystalliser according to DE-A-1 799 123, is to spray the liquid medium in the crystalliser in order to wet the pipes externally.

Also, the invention is not restricted to the example of falling-film crystallisation shown. On the contrary, the invention is applicable to other crystallisation methods, such as static crystallisation. The pipes 75, for example, can be replaced by cooling elements of a different configuration.

I claim:

1. A method of separating a substance from a liquid mixture by fractional cyrstallisation, comprising depositing a layer of crystals in a first crystalliser on one side of a wall disposed within said first crystalliser, while cooling the other side of the wall by evaporation of a liquid medium, controlling a pressure of a resultant gaseous phase in accordance with a temperature required for crystallisation after which, for melting the crystallised layer or for sweating, heating said other side of the wall by a gaseous medium produced by evaporation during crystallisation in a second crystalliser, controlling the pressure thereof in accordance with the temperature required for melting, and optionally supplying additional heat energy to the first crystalliser for evaporation of the liquid medium.

2. The method according to claim 1, which further comprises subsequently withdrawing excess heat energy from the gaseous phase or gaseous medium by an auxiliary condenser.

3. The method according to claim 2, wherein the liquid medium for evaporation for crystallisation on the outer side of the wall is conveyed in a circuit through the crystalliser.

4. The method according to claim 3, wherein the liquid medium is curved upwards from a sump of the crystalliser and is trickled in a film down the other side of the wall.

5. The method according to claim 4, wherein the liquid medium is stored in a collecting tank and a pressure is maintained in said collection tank such that the pressure difference between the collecting tank and the respective crystalliser is sufficient for the liquid medium at the beginning of crystallisation to be conveyed to the crystalliser and for the liquid medium to be conveyed from the crystalliser to the collecting tank at the beginning of sweating or melting.

6. The method according to claim 1, wherein the liquid medium for evaporation for the crystallisation on the other side of the wall is conveyed in a circuit through the crystalliser.

7. The method according to claim 6, wherein the liquid medium is pumped upwards from a sump of the crystalliser and is trickled in a film down the other side of the wall.

8. The method according to claim 1, wherein the liquid medium is stored in a collecting tank and a pressure is maintained in said collection tank such that the pressure difference between the collecting tank and the respective crystalliser is sufficient for the liquid medium at the beginning of crystallisation to be conveyed to the crystalliser and for the liquid medium to be conveyed from the crystalliser to the collecting tank at the beginning of the sweating or melting.

9. A device comprising at least one crystalliser comprising:

a casing, a crystallisation chamber, a medium chamber, the crystallisation chamber being separated from the medium chamber by a wall on which crystals can be deposited, the medium chamber having at least one inlet and one outlet for the liquid medium and at least one connection for an inflow and outflow of the gaseous phase of the medium, pressure controllers for controlling a pressure of a gaseous phase of the medium in the crystalliser, and a radiator for evaporating the liquid medium.

10. The device according to claim 9, wherein the radiator is disposed in a sump for the liquid medium in the crystalliser.

11. The device according to claim 10, further comprising an auxiliary condenser.

12. The device according to claim 10, which further comprises:

an auxiliary condenser, an inlet and outlet device for the gaseous phase of the medium which is disposed in the medium chamber of the crystalliser and has upwardly directed openings, the inlet and outlet device having openings in the form of slits at the top thereof, a drop separator which is disposed at a distance above the inlet and outlet device, the drop separator comprising a collecting trough disposed concentrically in the crystalliser casing and having an outlet and an edge which extends downwards over the trough bottom, with an annular gap being formed between the wall of the casing and the drop separator, a perforated tray which is disposed at a distance below the inlet and outlet device for the gaseous phase of the medium, and a collecting tank for the liquid medium, wherein the pressure of the medium is maintainable by a pressure-measuring and control device at a value such that the liquid medium can be conveyed to the crystalliser or to the collecting tank by the pressure difference between the collecting tank and the respective crystalliser depending on the mode of operation of the crystalliser.

13. The device according to claim 12, wherein each crystalliser has a pump for conveying the liquid medium for cooling the wall on which the crystals can be deposited.

14. The device according to claim 9, further comprising:

an inlet and outlet device for the gaseous phase of the medium which is disposed in the medium chamber of the crystalliser and has upwardly directed openings, and a drop separator which is disposed at a distance above the inlet and outlet device.

15. The device according to claim 14, wherein the inlet and outlet device is in the form of a pipe cross having openings in the form of slits at the top thereof.

16. The device according to claim 14, wherein the drop separator comprises a collecting trough disposed concentrically in the crystalliser casing and having an outlet and an edge which extends downwards over the trough bottom, an annular gap being formed between the wall of the casing and the drop separator.

17. The device according to claim 14, which further comprises a perforated tray which is disposed at a distance below the inlet and outlet device for the gaseous phase of the medium.

18. The device according to claim 9, wherein each crystalliser has a pump for conveying the liquid medium for cooling the wall on which the crystals can be deposited.

19. The device according to claim 9, which further comprises a collecting tank for the liquid medium, wherein the pressure of the medium is maintainable by a pressure-measuring and control device at a value such that the liquid medium can be conveyed to the crystalliser or to the collecting tank by the pressure difference between the collecting tank and the respective crystalliser depending on the mode of operation of the crystalliser.

\* \* \* \* \*